A. H. TAIT & C. A. FORD.
MANUFACTURE OF VINEGAR.
No. 181,999. Patented Sept. 5, 1876.
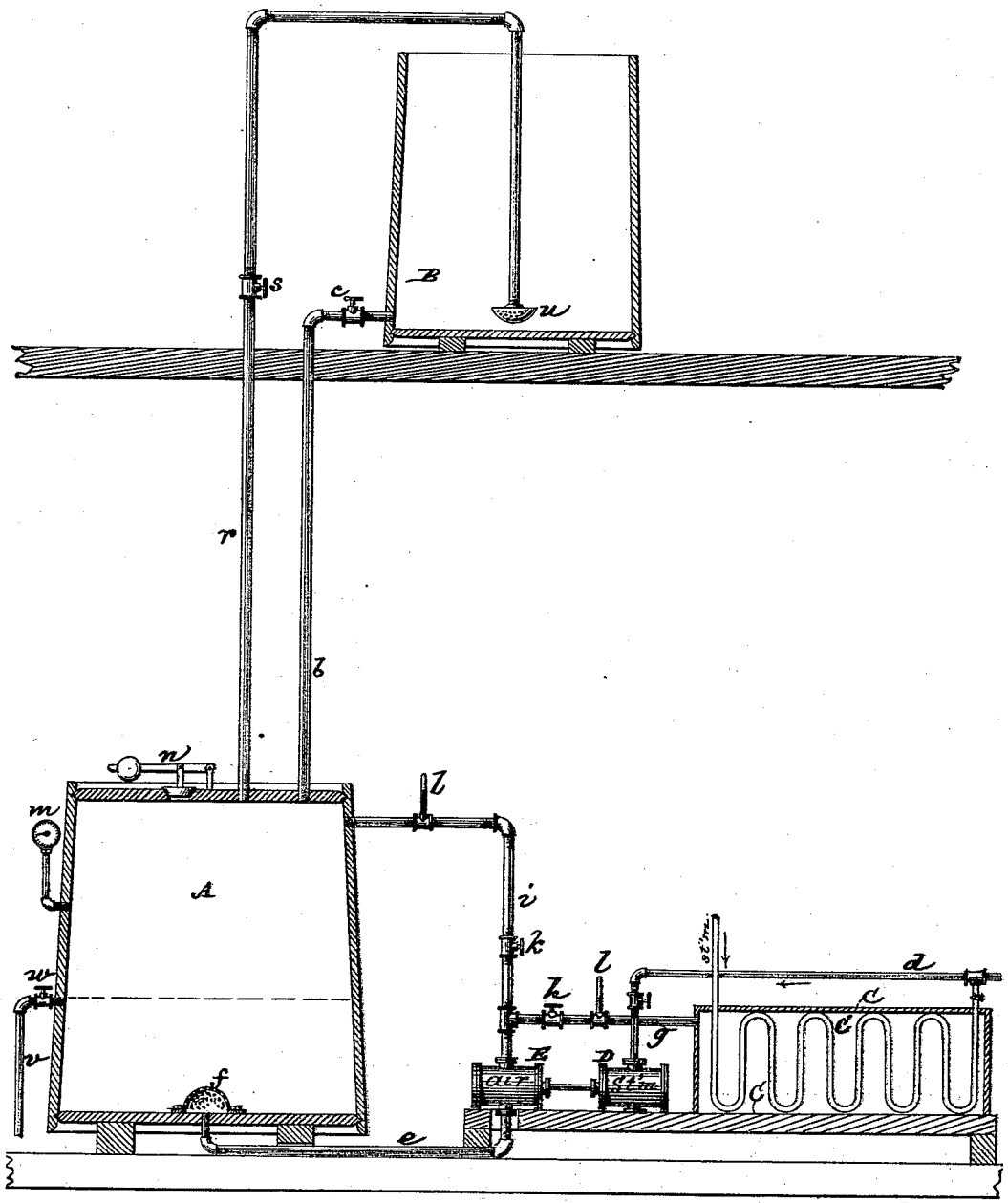

UNITED STATES PATENT OFFICE.

AUGUSTUS H. TAIT, OF JERSEY CITY, NEW JERSEY, AND CORNELIUS A. FORD, OF BROOKLYN, NEW YORK.

IMPROVEMENT IN THE MANUFACTURE OF VINEGAR.

Specification forming part of Letters Patent No. 181,999, dated September 5, 1876; application filed March 6, 1876.

*To all whom it may concern:*

Be it known that we, AUGUSTUS HENRY TAIT, of Jersey City, in the county of Hudson and State of New Jersey, and CORNELIUS A. FORD, of Brooklyn, in the county of Kings and State of New York, have jointly invented certain new and useful Improvements in the Manufacture of Vinegar; and we do hereby declare that the following is a full, clear, and exact description of the same, reference being had to the accompanying drawing, which forms part of this specification.

This invention is applicable to the acetification of fermented liquids or liquid containing alcohol of various kinds, including worts from which the gluten has been extracted by under fermentation at a low temperature. The general principle we pursue in carrying out our invention as regards the process of acetification is merely the union of the alcohol of the various fermentation with the oxygen of the atmospheric air at a high temperature—say 95° Fahrenheit, more or less, as has heretofore been done in the manufacture of whisky-vinegar, by passing the liquor through beech-wood shavings, which, however, soon clog and prevent the passage of the air. We consequently resort to another well-known expedient, namely, that of simply forcing air through the liquid to be acetified; but such, as heretofore practiced, has been only partially successful, and very wasteful, owing, in part, to the improper temperature of the air forced through the liquid, but mainly to the fact that the union of the oxygen of the air with the alcohol of the liquid has not been instantaneous, but has required such a prolonged contact for the atoms to unite that the current of air, passing rapidly through the liquid, only acetifies very partially, and it has been necessary to use a large volume of air, the greater portion of which produces no effect in the acetification, while the surplus air carries off a quantity of the volatile alcohol, thereby causing great loss.

Our improved process remedies these defects; and the invention consists in a novel mode and means of producing a perfect and economical union of the oxygen of heated air with the alcohol of the liquid under treatment in a close acetifier or vessel, within which said air is circulated till deprived of its oxygen, and the nitrogen of the exhausted air is returned to the vessel which supplies the acetifier with liquid.

The accompanying drawing represents a sectional elevation of an apparatus for making vinegar in accordance with our invention.

A is the acetifier, or vessel, in which the fermented liquor or liquid containing alcohol is converted into vinegar. This vessel is a close one. B is the charger, containing the liquid to be acetified, and serving to furnish a constant supply of the same to the vessel A, beneath, by means of a pipe, $b$, fitted with a cork, $c$. C is the steam-heater, supplied with steam by a pipe, $d$, from a steam-boiler, and serving to heat the air in the heater to the required temperature, which may be about 95° Fahrenheit, to acetify the liquid in accordance with our invention. D is the steam-cylinder, and E the air-cylinder, of a steam-pump for drawing and forcing fresh hot air from the heater C into the acetifier A, at or near its bottom, through a pipe, $e$, and perforated distributer, $f$, the hot air being drawn from the heater by a pipe, $g$, which is provided with a stop-cock, $h$. The air-cylinder E of the pump is also connected by a pipe, $i$, with the acetifier A, near its top, and such pipe, fitted with a stop-cock, $k$, which is opened when the cock $h$ is closed, to return air from the acetifier to the pump, for the purpose of keeping up a constant circulation of air through the liquid in the acetifier A until the oxygen of the air is exhausted.

It is desirable to provide the acetifier and its connections with thermometers $l\,l$, a liquor-gage, a pressure-gage, $m$, and a safety-valve, $n$, to temper or regulate and provide for the safety of the apparatus. Furthermore, the acetifier A is provided with a pipe, $r$, having a cock, $s$, and projected upward from the top of the acetifier, and down through into the charger B, where it may be provided with a perforated distributer, $u$. This pipe $r$ is to allow the nitrogen gas of the exhausted air to escape after it has been deprived of oxygen.

A draw-off pipe, *v*, having a cock, *w*, is fitted to the acetifier A, to run off the vinegar, as made, into any suitable receiver.

In the operation of the apparatus, fresh air, heated to about 95° Fahrenheit, more or less, is pumped from the heater C into the acetifier A by means of the steam-pump D E, the acetifier having been previously loaded to about one-quarter of its capacity, more or less, with good standard vinegar to act as an acid ferment. The fermented liquid, or liquid containing alcohol, is at the same time supplied in regular or suitable quantities by the pipe *b* to the acetifier A—that is, as fast as said liquid is converted up to the strength of the vinegar in the acetifier—care being taken that all the alcohol in the liquid under treatment is converted into acetic acid, as the process goes on, and the pump D E, on opening the cock *k* and closing the cock *h*, is kept at work, after a proper supply of fresh hot air has been introduced into the acetifier, to draw the vapors and air from the top of the acetifier and force them back through the liquid in the bottom of the latter, thus maintaining a constant circulation until the oxygen of the air has united with the alcohol of the liquid as it descends from the charger B. This may be ascertained by testing the vinegar in the acetifier. The return-cock *k* to the pump is then closed, and the fresh hot-air cock *h* opened again to supply fresh heated air to the acetifier, while the nitrogen of the exhausted air is allowed to escape by the pipe *r* into the liquid in the charger B, thereby avoiding any waste of the vinegar by evaporation.

By this improved process and apparatus we are enabled to acetify rapidly and uniformly, without any loss from evaporation, and at but a slight cost of fuel to work the pump, inasmuch as all the air pumped into the apparatus is utilized, and by maintaining a rapid circulation each atom of alcohol is always in contact with the oxygen of the air, and there is little or no loss of any kind.

We claim—

1. The process, herein described, of making vinegar by forcing a current or currents of heated air through the liquid in a close acetifier or vessel, and among or through the liquid being introduced thereto, and afterward keeping up a constant circulation of said air within the close vessel and liquid, substantially as specified.

2. An apparatus for making vinegar by the introduction and circulation of heated air among or through the liquid to be converted, consisting of a heater, C, a close acetifier or vessel, A, a pump connecting the heater with the acetifier both above and below, subject to the control of stop-cocks or valves, and a charger, B, for supplying the liquid to the acetifier, essentially as described.

3. The combination, with the close acetifier A, through which the air is circulated to convert the liquid into vinegar, of the escape-pipe *r*, for the nitrogen of the exhausted air, and the charger B, into which said pipe is entered, substantially as specified.

A. H. TAIT.
C. A. FORD.

Witnesses:
MICHAEL RYAN,
FRED. HAYNES.